No. 849,879. PATENTED APR. 9, 1907.

H. ADELMAN.

HORSESHOE.

APPLICATION FILED JAN. 25, 1907.

Inventor

Henry Adelman

Witnesses

T. L. Mockabee

H. G. Keithley

By Rexford M. Smith,

Attorney

THE NORRIS PETERS CO., WASHINGTON, D. C.

UNITED STATES PATENT OFFICE.

HENRY ADELMAN, OF COLUMBUS, OHIO.

HORSESHOE.

No. 849,879. Specification of Letters Patent. Patented April 9, 1907.

Application filed January 25, 1907. Serial No. 354,116.

*To all whom it may concern:*

Be it known that I, HENRY ADELMAN, a citizen of the United States, residing at Columbus, in the county of Franklin and State of Ohio, have invented a certain new and useful Horseshoe, of which the following is a specification, reference being had therein to the accompanying drawings.

This invention relates to horseshoes; and the object of the invention is to provide a horseshoe of special construction embodying means whereby said shoe may be readily placed upon and adjusted to the hoof and securely fastened thereon.

The horseshoe comprises substantially equal sections which are pivotally connected together at the toe of the shoe, the said sections embodying inclined hoof-embracing flanges, a curved spring having the ends thereof permanently attached to the shoe-sections, means for drawing the sections toward each other or spreading the same apart, means for fastening the sections in rigid relation to each other, and a hoof-embracing strap for securing the shoe as a whole on the hoof.

With the above and other objects in view the invention consists in the novel construction, combination, and arrangement of parts herein fully described and claimed.

Figure 1:
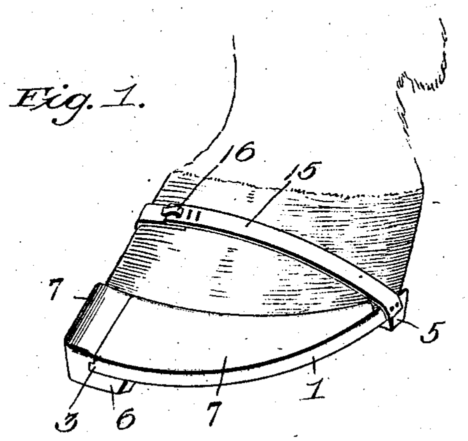
Figure 2:
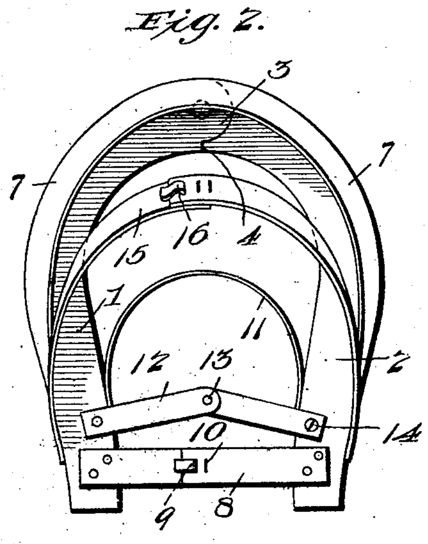
Figure 3:
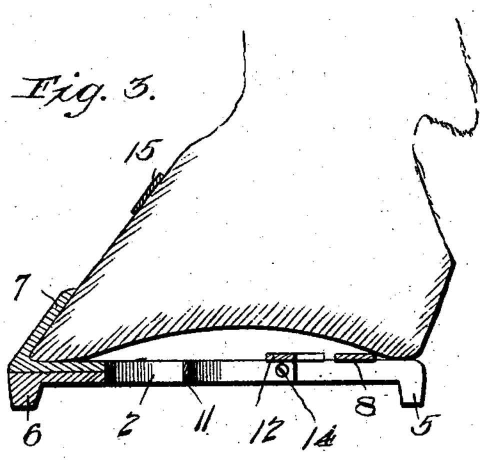
Figure 4:
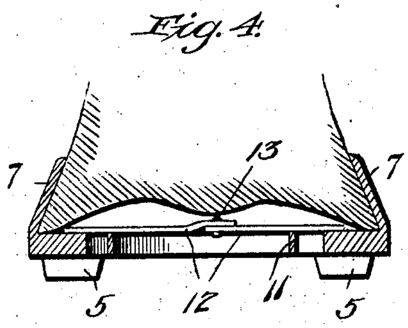

In the accompanying drawings, Figure 1 is a perspective of the shoe shown applied to a hoof. Fig. 2 is a plan view of the shoe. Fig. 3 is a vertical longitudinal section through the same. Fig. 4 is a cross-section thereof; and Fig. 5 is a view similar to Fig. 1, showing a modification in the form of the hoof-embracing flanges.

The horseshoe contemplated in this invention is composed of two substantially equal sections 1 and 2, and the sections where they meet at the toe of the shoe are pivotally connected together by a joint resembling a rule-joint, embodying a common single connecting-pivot which passes through overlapping ears 3 on the sections and radial inwardly-projecting shoulders 4, which abut squarely together and limit the inward movement of the sections, thereby preventing injurious pinching of the hoof. Where the hoof is unusually narrow or small, the shoulders 4 may be filed away sufficiently to enable the sections to be brought inward into firm engagement with the hoof. The sections may be provided with the usual heel and toe calks 5 and 6, respectively.

Figure 5:
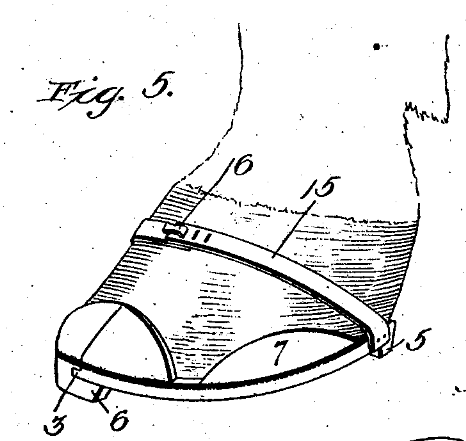

Each of the sections 1 and 2 is provided with an inclined hoof-embracing flange 7, and this flange may be continuous, as shown in Fig. 1, or it may be composed of two or more parts or sections, as shown in Fig. 5. These flanges bear against the outer surface of the hoof, as shown in the drawings, and prevent the escape of the shoe from the hoof when the sections are drawn toward each other and fastened, as hereinafter described.

The heel ends of the sections 1 and 2 are connected by a stay strap or connection 8, the ends of which are secured to the sections, said strap being cut in two intermediate its length and one member being provided with a buckle-tongue 9, while the other member is provided with a plurality of holes 10, into and through any one of which the tongue 9 may be passed after the sections have been drawn toward each other into snug engagement with the hoof, said strap preventing the spreading and consequent release of the shoe-sections.

A curved spring 11 has the opposite extremities thereof secured to the sections 1 and 2, the curved body portion of the spring lying between the sections and serving to press the sections toward each other in positioning the shoe on the hoof. Said spring yields, however, to allow the sections to be forced apart while applying or removing the shoe.

In order to limit the outward movement of the shoe-sections, I provide a pair of links 12, which are pivotally connected at their outer ends to the sections 1 and 2 and connected together at their inner ends by a common pivot 13. The parts 12 also serve as toggle-links to assist in drawing the sections toward each other in applying the shoe and also to spread the sections apart in removing the shoe.

Under the preferred embodiment of this invention the connections between the spring and links at one end with the adjacent shoe-sections are made in the form of screws 14 or other form of removable fasteners, so that the two shoe-sections may the more readily be separated and taken apart for repair purposes.

The shoe as a whole is fastened to the hoof by means of a hoof-embracing strap 15, the opposite ends of which are permanently secured to the opposite sides of the shoe, while at an intermediate point in its length said strap is divided and provided with a buckle 16 for the purpose of adjustment. This strap passes upward over the front of the hoof and in connection with the flange 7 holds the shoe securely on the hoof.

By means of the construction described a set of horseshoes may be quickly placed upon and removed from the animal, thus making it practicable to remove the shoes at night and replace the same in the morning, also to change the shoes as often as may be necessary on account of changes in the weather.

I claim—

A horseshoe comprising substantially equal sections pivotally united at the toe of the shoe, inclined hoof-embracing flanges on said sections, an arched spring having the opposite ends thereof permanently attached to the shoe-sections, means for drawing the sections toward each other or spreading the same apart, means for fastening the sections in rigid relation to each other, and a hoof-embracing strap for securing the shoe as a whole on the hoof.

In testimony whereof I affix my signature in presence of two witnesses.

HENRY ADELMAN.

Witnesses:

REXFORD M. SMITH,

CHAS. E. RIORDON.

Corrections in Letters Patent No. 846,879.

It is hereby certified that in Letters Patent No. 846,879, granted March 12, 1907, upon the application of Montgomery Waddell, of New York, N. Y., for an improvement in "Apparatus for Forming Filaments of Metamorphosed Cellulose, &c.," errors appear in the printed specification requiring correction, as follows: In lines 42–43, page 2, the word "desised" should read *desired*, and in line 94, the word "fixed" should read *fixing;* and that the said Letters Patent should be read with these corrections therein that the same may conform to the record of the case in the Patent Office.

Signed and sealed this 2nd day of April, A. D., 1907.

[SEAL.]

E. B. MOORE,

*Acting Commissioner of Patents.*